United States Patent [19]

Nething

[11] 4,256,182
[45] Mar. 17, 1981

[54] HAMMER PLOW

[76] Inventor: Dell W. Nething, 25512 Narbonne Ave., Lomita, Calif. 90717

[21] Appl. No.: 42,606

[22] Filed: May 25, 1979

[51] Int. Cl.³ .................. A01B 33/02; A01B 33/10
[52] U.S. Cl. .......................... 172/45; 172/72; 172/112; 172/78; 172/199
[58] Field of Search ............. 172/45, 72, 112, 199, 172/122, 78

[56] References Cited

U.S. PATENT DOCUMENTS

| | | | |
|---|---|---|---|
| 1,257,838 | 2/1918 | Frew et al. | 172/199 X |
| 1,377,602 | 5/1921 | Rutherfurd | 172/45 X |
| 1,628,101 | 5/1927 | Baldwin | 172/45 |
| 1,862,035 | 6/1932 | Rainwater | 172/45 |
| 2,787,943 | 4/1957 | Browning | 172/45 |
| 3,012,616 | 12/1961 | Horowitz | 172/122 X |
| 3,388,750 | 6/1968 | Hamm | 172/45 |

FOREIGN PATENT DOCUMENTS

| | | | |
|---|---|---|---|
| 464985 | 8/1928 | Fed. Rep. of Germany | 172/45 |
| 527961 | 8/1921 | France | 172/122 |
| 341852 | 12/1959 | Switzerland | 172/45 |

Primary Examiner—Paul E. Shapiro
Attorney, Agent, or Firm—Fulwider, Patton, Rieber, Lee & Utecht

[57] ABSTRACT

A hammer plow is provided with a series of disks spaced along and rotatable with a sleeve that turns about an axle on a number of bearings located therebetween. Each of the disks has a plurality of hammers rotatably attached thereto, which are free to rotate in complete circles. The rotatable length of the hammers is shorter than the distance from the points of attachment to the disks to the sleeves or spacers therebetween. A hammer striking an obstruction in ground to be plowed will not break, but is free to counter-rotate relative to the disk to which it is attached. Numerous agricultural and construction grading operations can be performed in a single pass of the device over ground to be plowed.

9 Claims, 4 Drawing Figures

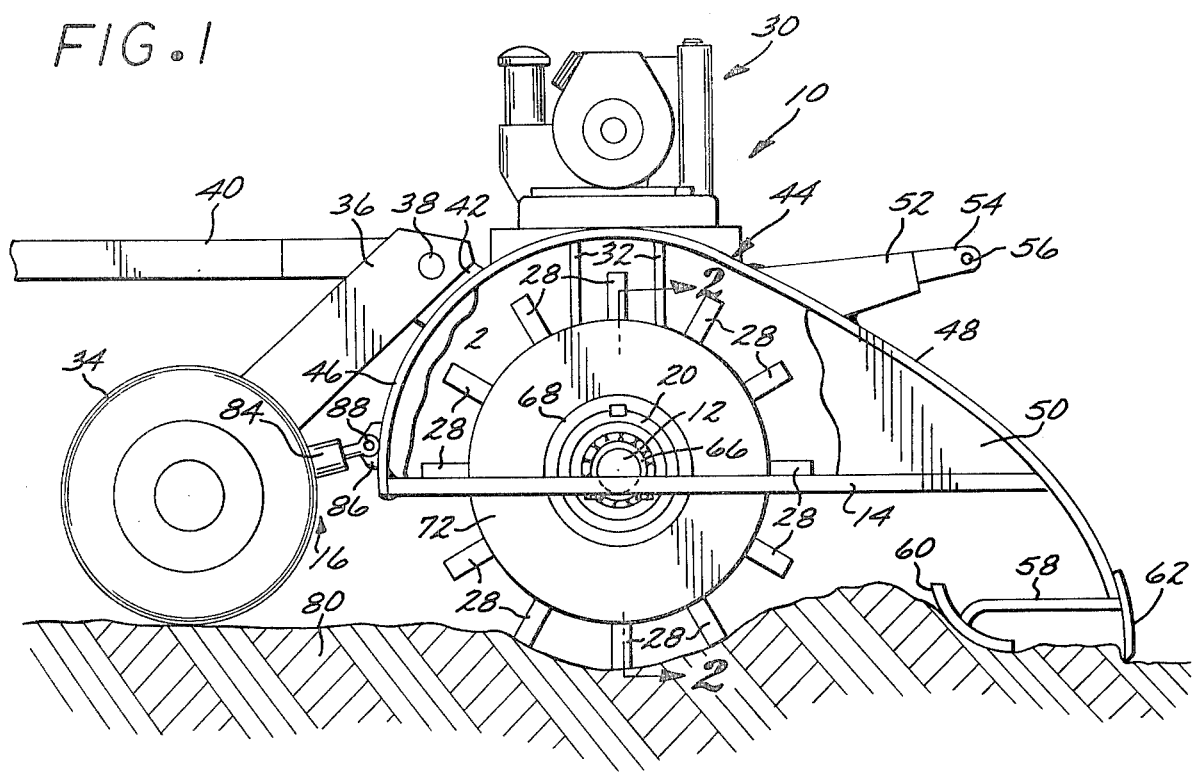

HAMMER PLOW

BACKGROUND OF THE INVENTION

1. Field of the Invention

The present invention relates to implements useful for plowing ground and for performing other operations in conditioning agricultural soil for planting, and also for use in plowing and grading in construction operations, such as breaking up old black top or cinder roads in a road bed preparatory to paving a road.

2. Description of the Prior Art

In conventional agricultural cultivation operations, a farmer makes a number of different passes over a field in which crops are to be grown in order to effectuate proper agricultural cultivation. Each time a different farm implement is drawn behind a tractor to achieve certain steps in soil cultivation. Initially, a bottom plow is dragged through a field to loosen the soil over acreage to be planted. Thereafter, a disk harrow is pulled over the same ground to break up large clods of earth. Next, a spring tooth plow is pulled behind the tractor to till the soil in preparation for planting. Thereafter, crops are typically seeded with a seed drill. A few weeks after planting it is necessary to harrow the land again with the spring tooth plow to destroy weeds that have grown up and which compete with the seedling crops for sunshine, moisture and nourishment from the soil.

In all, five different soil cultivation operations are required to properly prepare the soil and plant seeds to initiate the growth of a field of a crops. Moreover, at least four different farm implements are required to effectuate the necessary soil cultivation. In the aggregate, these operations represent a considerable expenditure of time on the part of the farmer performing them, and fuel consumed by the tractor in making the repeated runs across the same ground. For example, to cultivate 50 acres of soil for planting, approximately 50 hours are required for one person to cultivate the plot with a three to fourteen inch bottom plow. A person must also expend 10 hours to disk the same acreage and 10 additional hours to harrow the plot with a spring tooth plow. Thereafter, eight to ten hours are required to seed the acreage and subsequently 10 hours are required to harrow the plot to kill weeds. In all of these operations, a tractor is required and consumes approximately 2 gallons of fuel per hour.

SUMMARY OF THE INVENTION

According to the present invention, a hammer plow is provided which replaces a bottom plow, disk and disk harrow, field cultivator, rototiller and spring tooth harrow. The hammer plow of the invention, unlike conventional plows, does not employ a tooth or object which is dragged through or over the ground to till the soil. Rather, the invention is a device which employs a series of disks keyed or otherwise attached to a sleeve that is driven about an axle at high speed. A plurality of bearings are provided between the axle and sleeve along the lengths thereof to properly support the disks upon the axle. At the periphery and between adjacent disks a plurality of hammers are rotatably secured and are constructed short enough so that they are free to rotate in entire circles, through 360°, should they strike an obstruction in the ground as plowing progresses. The ability to counter-rotate relative to the disks prevents the hammers from being broken or dislodged from the disks between which they are carried.

Using the present invention, all of the conventional soil cultivation and planting operations can be performed in a single pass over acreage to be planted. To do this, a conventional seed drill is attached to trail behind the hammer plow of the invention and to deposit seeds in the cultivated soil. Thus, in a single pass over a 50 acre field a farmer is able to cultivate and plant seed in approximately three hours, a task which requires approximately 90 working hours using conventional devices. Furthermore, the reduction in time required for cultivation and planting proportionately reduces the fuel consumed by a tractor in traversing the terrain.

As the disks of the hammer plow rotate, the hammers are flung outward under centrifugal force and cut through the soil, grinding it exceedingly fine. As previously noted, the hammers are free to rotate in circular paths at the edges of the disks, parallel to the planar rotation of the disks. Spacers between the disks ensure that the hammers do not interfere with each other during disk rotation. Also, a one quarter inch steel protective cover is mounted over the disks to prevent any hammer which might be dislodged or broken from being thrown through the air and injuring any person in the vicinity.

Preferably, the disks of the invention are each formed of steel about 30 inches in diameter, and the hammers are preferably rectangular steel bars $\frac{1}{4}$ inch thick, $\frac{1}{2}$ inch wide and about 6 inches long. The disks are preferably spaced about $\frac{1}{2}$ inch apart. Preferably, the sleeve upon which the disks are mounted is driven at approximately 3600 rpm by a 200 horsepower diesel engine.

Due to the extremely high speed and forces developed by the hammers, the soil across which the hammer plow is pulled is mascerated and ground so finely and so thoroughly that weed growth is set back 6 or 8 weeks. This therefore reduces the necessity for subsequent harrowing to destroy weeds, since by the time weed growth develops the planted crop will have matured sufficiently to thoroughly dominate and suppress weed growth. For the same reason, it is not necessary to apply any type of chemical weed killer once acreage has been cultivated using the device of the invention. When used for agricultural cultivation, the hammer plow will also thoroughly chew up and grind undesired roots, small rocks, and other surface and subsurface obstructions.

Because of the extreme fineness to which soil is ground using the hammer plow of the invention, insects and insect eggs are not merely moved with small clods of dirt, as with conventional soil cultivation devices, but rather are thoroughly lacerated and destroyed. This significantly depletes the population of insects, corn borers, weevils, and other pests, and retards their repropagation by destroying their eggs. Conventional insecticides typically operate effectively only upon live insects, and are largely ineffectual against the growth and maturation of insect eggs.

The hammer plow of the invention plows and grinds the surface across which it is pulled so thoroughly, that is has application beyond agricultural cultivation. For example, the hammer plow of the invention can be used to rip up old black top, cinder packed roads, and other paths to remove old concrete, stones, or other hard surfaces in preparation for the construction of a new road, or for other construction. The hammer plow is powerful enough to excavate old black top, concrete sidewalks, and other impediments to road building or other construction operations.

The invention may be described with greater clarity and particularity by reference to the accompanying drawings.

DESCRIPTION OF THE DRAWINGS

FIG. 1 is a side elevational view of the invention with one of the protective end plates partially cut away to facilitate illustration of the invention;

FIG. 2 is a front sectional view taken along the lines 2—2 of FIG. 1;

DESCRIPTION OF THE PREFERRED EMBODIMENT

Figure 3:
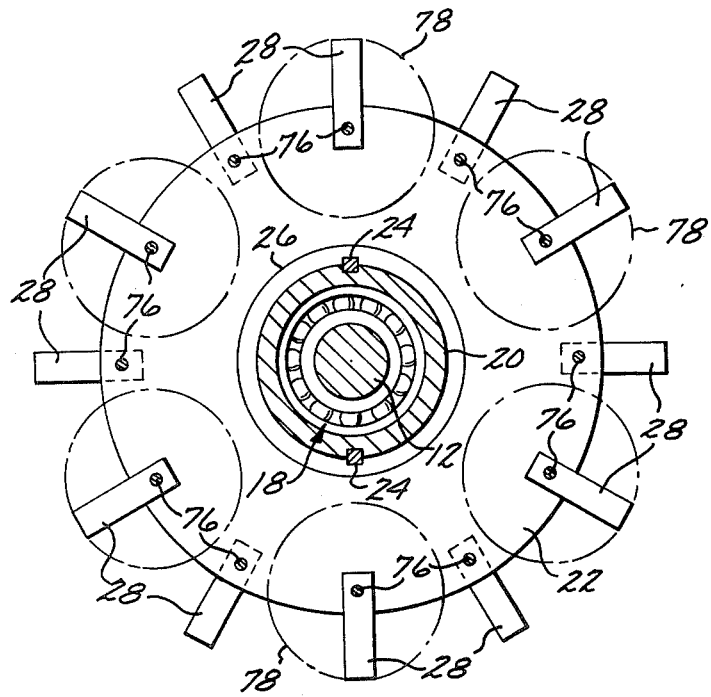
FIG. 3 is a side sectional view taken along the lines 3—3 of FIG. 2.
Figure 4:
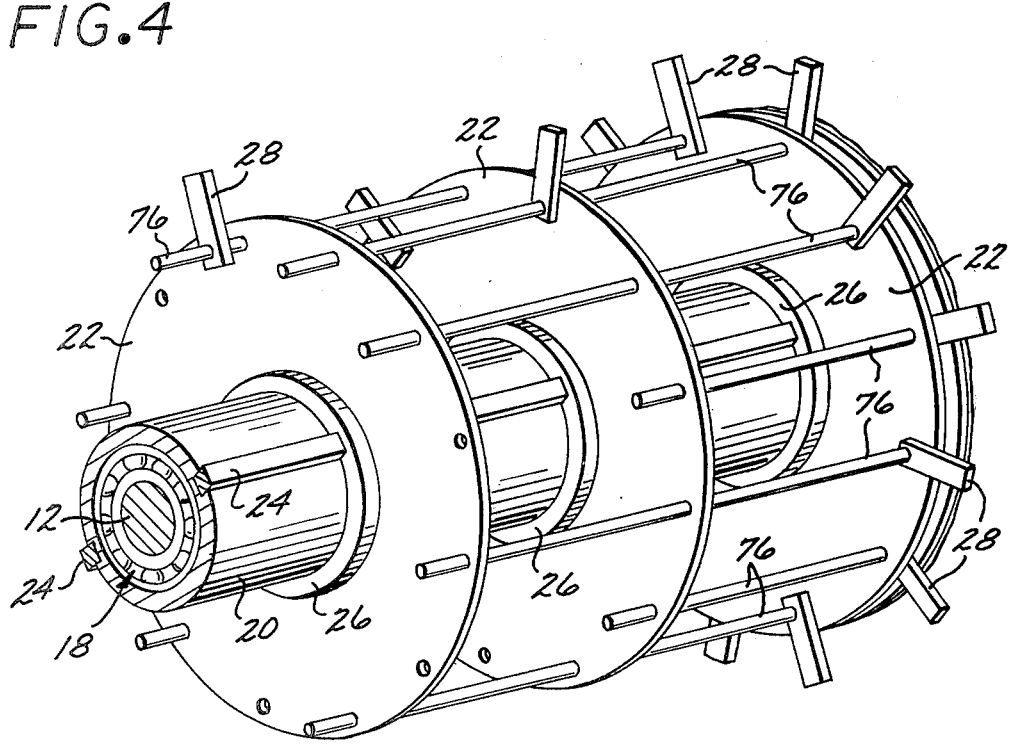
FIG. 4 is a perspective view showing the manner in which the disks of the invention are mounted with an exaggerated separation between disks for purposes of illustration.

With reference to FIG. 1, a hammer plow 10, constructed according to the present invention, is illustrated. The hammer plow 10 includes a solid cylindrical axle 12 of about three inches in diameter and about eight feet long, mounted between opposing longitudinal parallel beams 14 which are coupled to a carriage 16 used to pull the axle 12 longitudinally perpendicular to its axial orientation. A plurality of annular ball bearing races 18 are positioned along the length of the axle 12 as illustrated in FIG. 2. An annular steel sleeve 20 is coaxially mounted about the axle 12 for rotation thereabout on the bearings 18. A plurality of annular disks 22, illustrated in FIGS. 3 and 4, are secured to the sleeve 20 by means of an elongated rectangular shaped key 24, received in keyways in the disks 22 and in the sleeve 20, as illustrated in FIG. 3. Annular spacers 26 are also provided and are keyed to the sleeve 20. The disks 22 are thereby spaced along the length of the sleeve 20 and coupled thereto for rotation therewith. A plurality of hammers 28 are mounted on each of the disks 22 at the periphery thereof for rotation parallel to the disks. As illustrated in FIG. 3, each hammer 28 is rotatable in a complete circular path, so that the hammers 28 do not strike the sleeve 20 or spacers 26. A diesel engine 30, illustrated in FIG. 1, drives the sleeve 20 in rotation about the axle 12 with a V-belt drive system, employing four parallel belts 32 acting upon the 8-inch diameter pulley ring 70 depicted in FIG. 2.

The carriage 16 includes a pair of wheels 34 mounted together about an axle and spaced no wider than the length of the axle 12, so as to allow the hammer plow 10 to pass closely adjacent to fences, walls and other boundary markers. Each wheel has a metal hub with an inflated rubber tire mounted thereon. From an axle sleeve (not visible) a pair of oppositely disposed mounting beams 36 angle upwardly and rearwardly and are joined by a transverse mounting rod 38 rotatably mounted therebetween. A forwardly extending carriage tongue 40 is welded to the mounting beams 36 and is directed forwardly and terminates in a conventional fitting (not shown) for attachment to a conventional tractor implement attachment fastener of a farm tractor. Such a fixture typically employs a clevis extending rearwardly from the tractor with an apertured forward extremity of the tongue 40 extending into the clevis. A transverse clevis pin then secures the tongue 40 to the tractor implement attachment fastener.

Short one-half inch steel mounting brackets 42 are welded to both the mounting beams 36, and also to an arcuately curved shell or hood 44 configured in a cross section forming a circular arcuate shield 46 at its front, and trailing in an elongated curved bonnet 48 at its rear, as depicted in FIG. 1. The forward shield 46 and rear bonnet 48 are longitudinally joined together by outboard fore and aft extending beams 14. Directly inwardly and welded to the beams 14 are vertically disposed longitudinally aligned end plates 50, one of which is broken away in FIG. 1 to clarify illustration of the invention. At the forward end of the bonnet 48 of the hood 44 there is a rearwardly extending arm 52 welded thereto and terminating in a conventional tractor type implement attachment fastener 54, such as a clevis. The clevis 54 has an aperture 56 therein, useful to accommodate a clevis pin. By employing the implement attachment fastener 54, a user of the invention is able to trail a seed drill behind the hammer plow 10.

At the lower rearward extremity of the bonnet 48 there are a plurality of forwardly extending steel braces 58 which are welded to the concave rear surface of an elongated arcuately configured guide shoe 60. A transverse grading plow blade 62 is bolted to the lower edge extremity of the back side of the bonnet 48 across the width thereof. The shoe 60 and grading blade 62 are useful in returning the plowed earth to a level contour, as will hereinafter be explained.

Preferably, the axle 12 is a solid steel cylindrical rod, eight feet long and three inches in diameter. The lower surfaces of the ends of the axle 12 are profiled to form flat faces which rest upon the fore and aft beams 14. U-bolt shackles 66, with fastening nuts on the threaded extremities thereof, are tightened to secure the axle 12 in position resting upon the fore and aft beams 14. The axle 12 does not rotate, but instead has a number of annular ball bearing race assemblies 18 positioned along its length about the outer surface thereof and truss bearings 33 at either end on the axle 12. In a preferred embodiment thirteen separate ball bearing race assemblies 18 are positioned at intervals along the length of the axle 12.

Between some of the ball bearing race assemblies 18 there are annular spacing sleeves 35 to keep the bearing race assemblies 18 from drifting longitudinally along the axle 12. These spacing sleeves 35 include axially extending locking protruberances which interact with corresponding recesses in the sides of the ball bearing assemblies 18 to keep the ball bearing assemblies 18 and the spacing sleeves 35 from turning relative to each other and also from turning on the axle 12.

An elongated annular sleeve 20, formed of ¾ inch thick steel is arranged coaxially about the axle 12 and rotatably upon the bearing race assemblies 18. The sleeve 20 is threaded at both ends 25 and 27. The sleeve 20 includes a pair of elongated channels 29 along its entire length running through the ends 25 and 27 to accommodate a pair of steel bars ½ inch square on all sides forming sleeve keys 24. The keys 24 extend the length of the sleeve 20 between the threaded extremities 25 and 27 thereof. The opposite ends of the sleeve 20 are threaded at 25 and 27 in oppositely oriented helical threads. That is, the thread at the end 25 is a left-hand thread while the thread at the opposite end 27 is a right-hand thread. An interiorly threaded retaining collar 68 is provided with a left-hand thread for mating engagement with the threaded end 25 of the sleeve 20. At the opposite end 27 an interiorly threaded 8 inch diameter four-groove pulley ring 70 is threadably engaged upon the sleeve 24. By forming the opposite ends 25 and 27 of the sleeve 20 with opposing helical threads, rotation of the disks 22 and the sleeve 20 will only serve to tighten the retaining collar 68 and pulley ring 70 toward each other.

At both ends of the sleeve 20 there are locking pins 31 positioned diametrically opposite each other and extending through the sleeve walls. Also at the ends of the sleeve 20, the bearings abutting the locking pins 31 are not ball bearing race assemblies, such as the bearings 18, but rather are truss bearings 33.

The annular disks 22 are formed of solid steel ¼ inch thick and all have two channels at their axial openings to receive the keys 24. The disks 22 are thereby coupled to the sleeve 20 for rotation therewith by means of the keys 24 as depicted in FIGS. 2-4. The disks 22 are separated by annular spacing rings 26, also formed with interiorly directed channels so that they are carried by the key 24 in rotation with the sleeve 20. The spacers 26 are preferably about ½ inch in axial length and are positioned about the sleeve 20 between the disks 22 to separate the disks 22 by a distance equal to their length. Immediately inwardly of both the pulley ring 70 and the retaining collar 68 there are 30 inch diameter, ¼ inch thick annular steel pin retaining plates 72, which entrap the sleeve key 24 therebetween and hold it centered on the sleeve 20.

The details of construction and interaction of the annular disks 22 and the hammers 28 rotatably mounted thereon are extremely important to the operation of the invention, and are illustrated best with reference to FIGS. 3 and 4. Each of the disks 22 is perforated by twelve apertures spaced evenly about the periphery thereof. Through each of these apertures, an elongated ¼ inch diameter steel rod 76 is provided to serve as a hammer pin. Each of the hammer pins 76 passes entirely through all of the disks 22 mounted on the sleeve 24, and are held between the pin retaining plates 72. The hammers 28 are mounted on each pin 76 only between alternate disks 22. That is, there are six hammers 28 mounted between any two adjacent disks 22, as illustrated in FIG. 3. However, there are also six hammers mounted between the next adjacent pair of disk surfaces, but these hammers are mounted in offset fashion as indicated in FIG. 3. In this manner, each of the elongated hammer pins 76 carries hammers only between alternate pairs of surfaces of adjacent disks 22. By offsetting the hammers 28 between adjacent disk surfaces in this fashion, there is less tendency for material to become jammed between adjacent hammers 28, and there is greater freedom for the ground soil, rocks, and roots to flow rearwardly beneath the bonnet 48 of the hood 44.

As illustrated in FIGS. 3 and 4, each of the hammers 28 is mounted about a hammer pin 76, and is formed of solid steel ¼ inch thick, ½ inch wide, and six inches long. The disks 22 are thirty inches in diameter and the hammers 28 are mounted about the hammer pins 76 approximately an inch inwardly from the disk perimeters. With reference to FIG. 3, it can be seen that the hammers 28 are free to rotate in complete circular paths 78 about the hammer pins 76 without interfering with other hammers, or with the spacers 26 or the sleeve 24. As a consequence, the hammers 28 do not tend to break or bend when they strike a hard obstruction in the ground 80 as the hammer plow 10 moves across a field, as depicted in FIG. 1. Rather, as each hammer 28 strikes the obstruction, it will inflict on it a significant gouge and rebound in counter-rotation relative to the disks 22 and sleeve 20. Although the hammers 28 will not break, their repeated sequential gouging will shortly break up most obstructions encountered in an agricultural field.

Operation of the invention is depicted in FIG. 1. A conventional farm tractor pulls the hammer plow 10 by means of the tongue 40 toward the left, as viewed in that drawing figure. The diesel engine 30 is a conventional 200 horsepower diesel engine having a drive shaft that operates at approximately 1800 rpm. The drive shaft is keyed to four 14 inch pulleys on the engine 30 which drive the V-belts 32, visible in FIG. 2, to turn the 8 inch pulley ring 70 at a speed of approximately 3000 rpm. The pulley ring 70, in turn, carries the sleeve 20, disks 22, spacers 26, and hammers 28 in rotation at the same angular speed about the bearings 18. By rotating a sleeve about bearings longitudinally positioned along the length of the axle 12, the sleeve 20 does not tend to deflect and oscillate about the axle 12. If the disks 22 were coupled directly to a rotatable axle turning within fixed bearings at either end, the heavy weight of the disks and hammers would laterally flex the axle at its center, and bend the axle and render the device inoperative within a very short period of time.

As the disks are driven counterclockwise, as depicted in FIG. 1, the hammers 28 are carried and flung centrifugally outwardly to gouge into the soil 80 and grind the soil, and any obstructions therein, exceedingly fine. As the hammers 28 gouge the earth, they tend to throw the ground soil rearwardly, whereupon that soil has a tendency to accumulate in piles beneath the bonnet 48 as the hammer plow 10 progresses forwardly. The shoe 60 has an outer, convex configuration which rides up and over any piles of soil created. The grading blade 62 extends slightly below the level of the shoe 60. By riding on top of the mounds of soil piled up beneath the bonnet 48, the shoe 60 carries the grading blade 62 in a fashion that allows it to smooth the soil as the hammer plow 10 progresses, without digging into the earth and halting the progress of the hammer plow 10.

The carriage 16 is provided with a hydraulic cylinder 84 which is rotatably coupled relative to the axle sleeve upon which the wheels 34 turn and to an attachment bracket 86 on the shield 46 of the hood 44 at a rotatable connection 88. When it is desired to move the hammer plow 10 into position to cultivate a field without disturbing the intervening ground, the hydraulic cylinder 84 is actuated to rotate the hood 44 about the mounting rod 38. That is, the hood 44 is rotated upwardly and rearwardly in a counterclockwise motion, as viewed in FIG. 1. Once the hammer plow 10 has been brought into position to effectuate cultivation, the hydraulic cylinder 84 is retracted and the hood 44 is lowered to the disposition depicted in FIG. 1.

As previously noted, the hammer plow of the invention can be used for purposes other than agricultural cultivation. Because of the intense forces and high speed developed by the hammers 28, the hammer plow 10 can be used to break up black top, cinder-packed surfaces, and even concrete in order to form a suitable bed for road building or other construction projects. In addition, the hammer plow 10 can be used, with a funneling arrangement behind the bonnet 48, to pick up hay, chop it, and elevate it upwardly and rearwardly without the requirement for a blower.

Undoubtedly, those skilled in the art will readily conceive of additional uses and structural embodiments for the hammer plow of the invention. Accordingly, the scope of the invention should not be considered restricted to the specific embodiment depicted, but rather as defined in the claims appended hereto.

I claim:

1. A hammer plow comprising:

an axle held transversely above a surface for longitudinal movement perpendicular to its axial orientation, a sleeve coaxially mounted about said axle for rotation thereabout, a plurality of bearing race assemblies longitudinally positioned along the length of said axle to carry said sleeve for rotation thereabout and provided in sufficient number to prevent said sleeve from deflecting and oscillating about said axle, annular spacing sleeves located about said axle between said bearing race assemblies to keep said bearing race assemblies from drifting longitudinally along said axle, said spacing sleeves and said bearing race assemblies including axially extending interlocking protruberances and corresponding recesses which immobilize said ball bearing race assemblies and said spacing sleeves from turning relative to each other and from turning on said axle, a plurality of annular disks of equal diameter equally spaced along the length of said sleeve and coupled thereto for rotation therewith, annular spacing rings arranged about said sleeve between each of said disks to hold said disks in fixed position along said sleeve and to prevent axial movement of said disks, a plurality of rods extending through all of said disks at equally spaced intervals about the periphery thereof in disposition parallel to said axle, a plurality of hammers mounted upon alternate ones of said rods between adjacent disks, said hammers being short enough to rotate in complete circular paths about said rods without interfering with any of said rods, without interfering with other hammers and without interfering with said spacing rings and said sleeve, said hammers being mounted on each rod only between alternate ones of said disks, and means for driving said sleeve in rotation about said axle at a speed exceeding 1800 revolutions per minute so that said hammers strike a surface to be plowed at a high speed.

2. A hammer plow according to claim 1 further characterized in that six hammers are located on each of said disks.

3. A hammer plow according to claim 1 further characterized in that said sleeve is mounted between end plates perpendicular to said axle, and a solid hood extends above said plates and over said disks.

4. A hammer plow according to claim 3 further comprising a grading blade connected to trail from said hood to grade material plowed up by said hammers.

5. A hammer plow according to claim 4 further comprising an upturned follower shoe located forwardly of said grading blade to guide said grading blade across plowed terrain.

6. A hammer plow according to claim 3 further comprising a wheeled carriage longitudinally offset from said axle, with wheels spaced no wider than the length of said axle, and said hood is carried by said carriage.

7. A hammer plow according to claim 6 further comprising retractable mounting means for alternatively carrying said axle in raised and lowered positions.

8. A hammer plow according to claim 3 further characterized in that said driving means includes a diesel engine having a drive shaft mounted atop said hood, and said diesel engine drive shaft is engaged with said sleeve by means of a belt drive system.

9. A hammer plow according to claim 1 further comprising annular spacers about one-half inch in axial length positioned about said sleeve to separate said disks, and said hammers are about one-quarter inch thick.

* * * * *